United States Patent [19]
Chiba

[11] Patent Number: 5,905,531
[45] Date of Patent: May 18, 1999

[54] COLOR NOISE SLICE METHOD AND CIRCUIT FOR AN IMAGE PICKUP DEVICE

[75] Inventor: Kazuhiro Chiba, Tokyo, Japan

[73] Assignee: NEC Corporation, Tokyo, Japan

[21] Appl. No.: 08/825,320

[22] Filed: Apr. 1, 1997

[30] Foreign Application Priority Data

Apr. 18, 1996 [JP] Japan ................................. 8-095767

[51] Int. Cl.$^6$ ............................ H04N 5/217; H04N 9/64; H04N 5/21; H04N 5/16
[52] U.S. Cl. ........................... 348/241; 348/242; 348/30; 348/624; 348/698
[58] Field of Search ..................................... 348/241, 242, 348/599, 624, 612, 698, 30; 382/167

[56] References Cited

U.S. PATENT DOCUMENTS

| 4,953,011 | 8/1990 | Mori et al. .............................. 348/30 |
| 5,264,944 | 11/1993 | Takemura ................................ 348/242 |
| 5,654,765 | 8/1997 | Kim ......................................... 348/624 |

OTHER PUBLICATIONS

LSI Kid Demosystem (MV–DS6A), System Section, Application Note, pp. 49–50, published by Hitachi Corp.

*Primary Examiner*—Wendy Garber
*Assistant Examiner*—Alicia M. Harrington
*Attorney, Agent, or Firm*—Whitam, Curtis & Whitham

[57] ABSTRACT

The object of the present invention is to provide a color noise slice circuit in which the color noise slice process does not cause changes in hue. The color noise slice circuit of the present invention is provided with a divider that receives color-difference signals (R-Y) and (B-Y) and calculates (R-Y)/(B-Y), a memory that stores values for $\theta=\tan^{-1}[(R-Y)/(B-Y)]$, memories for storing $\sin \theta$ and $\cos \theta$, a noise slice width setting circuit that sets the slice width $\Delta S$, multipliers that calculate $\Delta Sr=\Delta S * \sin \theta$ and $\Delta Sb=\Delta S * \cos \theta$, and slice circuits that execute color noise slice processing of color-difference signals (R-Y) and (B-Y) using $\Delta Sr$ and $\Delta Sb$, respectively, as color noise slice widths.

6 Claims, 7 Drawing Sheets

COLOR NOISE SLICE METHOD AND CIRCUIT FOR AN IMAGE PICKUP DEVICE

BACKGROUND OF THE INVENTION

1. Field of the Invention

The present invention relates to a color noise slice method and a circuit for carrying out this method, and particularly relates to a color noise slice method and circuit for carrying out color noise slice processing to reduce noise in the chrominance signal component in digital image pickup output of image pickup elements.

2. Description of the Related Art

Figure 1:
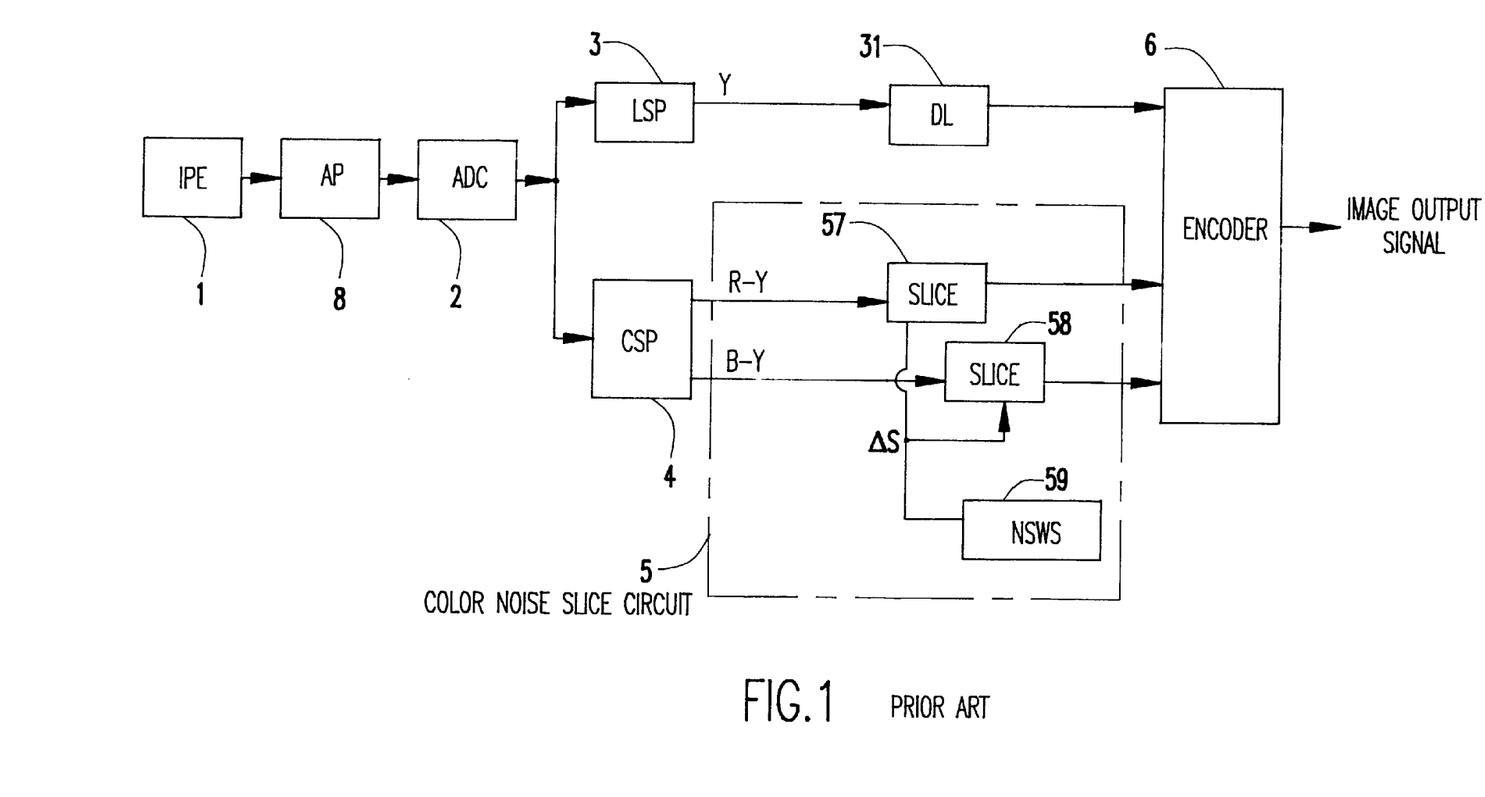
FIG. 1 shows the construction of a color noise slice circuit of the prior art.

FIG. 1 shows the construction of an example of this type of color noise slice circuit of the prior art. Referring to FIG. 1, an output signal of image pickup element (IPE) 1, after prescribed analog processing such as sample hold or automatic gain control in analog processing circuit (AP) 8, is converted to a digital signal by analog digital converter (ADC) 2, and supplied to both luminance signal processing circuit (LSP) 3 and chrominance signal processing circuit (CSP) 4.

Luminance signal processing circuit 3 performs prescribed processing such as edge enhancement processing or gamma correction on the signal received from analog digital converter 2, and generates luminance signal Y. Delay circuit (DL) 31 performs delay processing to delay the luminance signal Y for a processing time necessary for color noise slice circuit 5 to process a chrominance signal. Description of color noise slice circuit 5 will be given in detail hereinbelow. The delay processing described above allows both luminance signal Y and color-difference signals (R-Y) and (B-Y) supplied from the same picture element simultaneously to be received by encoder 6 in the next stage.

Chrominance signal processing circuit 4 generates color-difference signals (R-Y) and (B-Y) after performing prescribed processing such as color demodulation, white balance processing, and gamma correction.

Color noise slice circuit 5 is provided with slice circuits 57 and 58 and noise slice width setting circuit 59. Noise slice width setting circuit (NSWS) 59 presets noise slice width $\Delta S$. Slice circuits 57 and 58 receive color-difference signals (R-Y) and (B-Y) and also preset noise slice width $\Delta S$, perform the color noise slice processing described below of color-difference signals (R-Y) and (B-Y) using $+\Delta S$ and $-\Delta S$ as thresholds, and provide slice-processed color-difference signals (R-Y)' and (B-Y)', respectively:

When $$(R\text{-}Y) > +\Delta S,\ (R\text{-}Y)' = (R\text{-}Y) - \Delta S \tag{1}$$

When $$-\Delta S \leq (R\text{-}Y) \leq +\Delta S,\ (R\text{-}Y)' = 0 \tag{2}$$

When $$(R\text{-}Y) < -\Delta S,\ (R\text{-}Y)' = (R\text{-}Y) + \Delta S \tag{3}$$

and
When $$(B\text{-}Y) > +\Delta S,\ (B\text{-}Y)' = (B\text{-}Y) - \Delta S \tag{4}$$

When $$-\Delta S \leq (B\text{-}Y) \leq +\Delta S,\ (B\text{-}Y)' = 0 \tag{5}$$

When $$(B\text{-}Y) < -\Delta S,\ (B\text{-}Y)' = (R\text{-}Y) + \Delta S. \tag{6}$$

Encoder 6 receives the Y signal, color-difference signal (R-Y)', and color-difference signal (B-Y)', and generates video output signals of a prescribed data format appropriate to video signals or appropriate to image processing such as NTSC, PAL, or SECAM.

Figure 2:
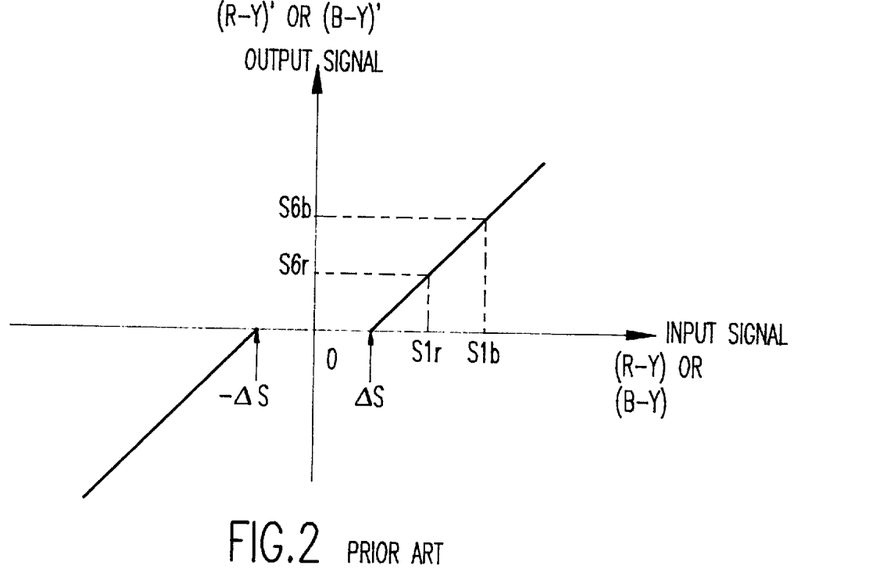
FIG. 2 shows the input/output characteristics of the color noise slice circuit of the prior art.

FIG. 2 shows the input/output characteristics of a color noise slice circuit. FIG. 2 shows the case in which color-difference signal (R-Y)' and (B-Y)' are generated by slice-processing of the received color-difference signals (R-Y) and (B-Y) using $\Delta S$ and $-\Delta S$ as slice threshold values.

Generally, operation error or random noise generated by chrominance signal processing mixes with the color-difference signal and becomes color noise of a low signal level, which can be sliced by the above-described color noise slice processing to allow a signal having low color noise level and accordingly a good color signal-to-noise ratio.

Figure 3:
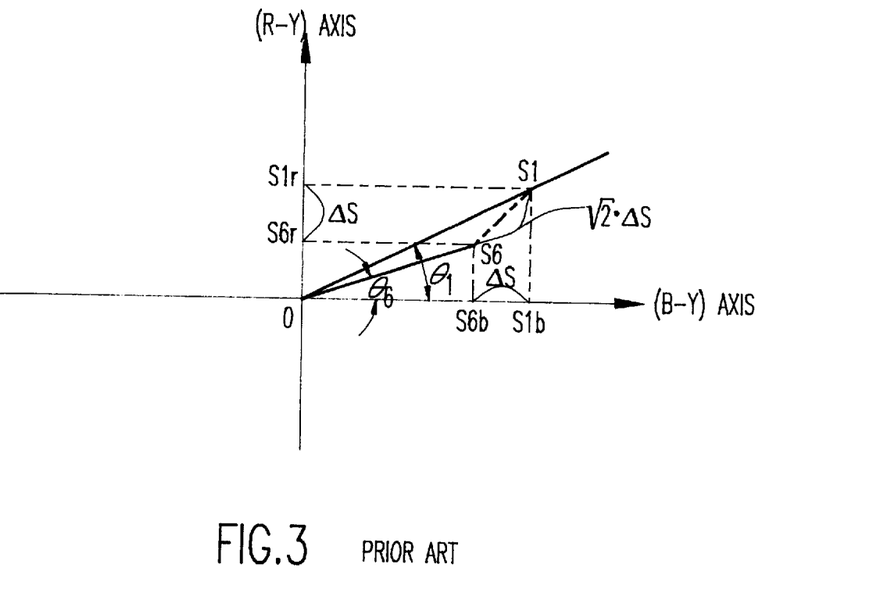
FIG. 3 is a color vector diagram showing a chrominance signal preceding and following color noise slice processing in the prior art.

FIG. 3 is a color vector diagram of a chrominance signal with color-difference signal (R-Y) as an ordinate and color-difference signal (B-Y) as an abscissa. In the figure, chrominance signals S1 and S6 denote the chrominance signals preceding and following the color noise slice processing, respectively. Here, the coordinate components of chrominance signals S1 and S6 are S1=(S1b, S1r) and S6=(S6b, S6r). In addition, the angles of chrominance signals S1 and S6 with respect to the (B-Y) axis are denoted by $\theta_1$ and $\theta_6$, respectively.

The relation between chrominance signals S6 and S1 in FIG. 3 is represented by:

$$S6b = S1b - \Delta S \tag{7}$$

$$S6r = S1r - \Delta S \tag{8}$$

As is known from the figure, the difference vector between vectors S1 and S6, i.e., (vector S1)–(vector S6), makes an angle of 45 degrees with respect to the (B-Y) axis and has a magnitude of $2^{1/2} * \Delta S$. Accordingly, the vector S6, i.e. the chrominance signal after the slice processing, directs to the direction different from that of the vector S1, i.e., the chrominance signal before the slice processing.

Figure 4:
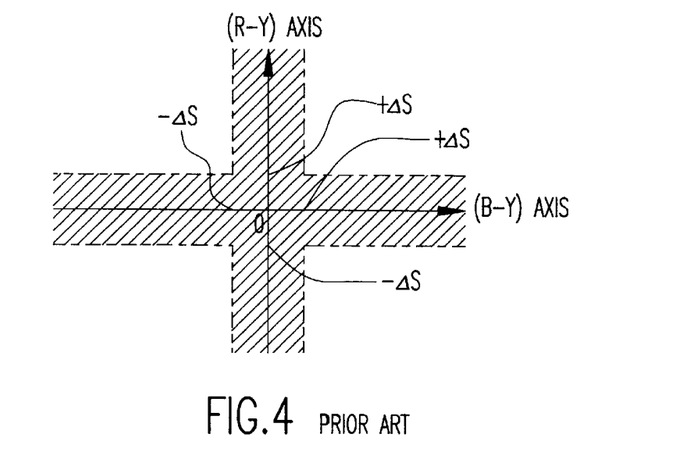
FIG. 4 is a color vector diagram showing the range of chrominance signals in which either color-difference signal R-Y or color-difference signal B-Y is vanished by color noise slice processing.

FIG. 4 is a color vector diagram showing the range of chrominance signal S in which at least one of color-difference signal components (R-Y) and (B-Y) of chrominance signal S vanishes as a result of slice processing by color noise slice circuit 5. In this figure, such ranges of chrominance signal S is shaded by slanted lines. If the (R-Y) and (B-Y) components of chrominance signal S, i.e., color-difference signals R-Y and B-Y, are Sr and Sb, respectively, then the chrominance signal components Sr and Sb become 0 through slice processing when they are within the range represented by the following inequalities:

$$-\Delta S \leq Sr \leq \Delta S \tag{9}$$

$$-\Delta S \leq Sb \leq \Delta S \tag{10}$$

As explained hereinabove, operation error or random noise generated by chrominance signal processing frequently mixes with the color-difference signal and becomes color noise of a low signal level. For example, in the circuit shown in FIG. 1, even if a chrominance signal received by chrominance signal processing circuit 4 is only a blue signal, a color-difference signal R-Y of a low signal level is likely to be included as a color noise, in addition to the chrominance signal component B-Y, within the chrominance signal delivered from chrominance signal processing circuit 4. If this color noise R-Y is small compared to ΔS, a chrominance signal containing this color noise will correspond to a color vector belonging to the slanted-line portion lying along the B-Y axis of the color vector space shown in FIG. 4.

The color noise component R-Y of this chrominance signal is eliminated after undergoing color noise slice processing by slice circuits 57, and the chrominance signal is transmitted as color-difference signal (B-Y)' (i.e., as a chrominance signal completely in the direction of the B-Y axis). Simultaneously, color-difference signal (B-Y) is also subjected to slice processing by slice circuit 58, and its signal level therefore lowers by ΔS.

The same situation also holds true when the desired color-difference signal (color-difference signal not containing noise) is R-Y and the color noise is B-Y.

In the color noise slice processing circuit of the prior art described hereinabove, a problem has been that, since color-difference signal (R-Y) and color-difference signal (B-Y) are both subjected to slice processing using the same ΔS or −ΔS as the threshold value, signal S1 preceding slice processing and signal S6 following slice processing inevitably have differing angles $\theta_1$ and $\theta_6$ with respect to the (B-Y) axis, as shown in FIG. 3.

In other words, received chrominance signal S1 is altered by noise slice processing to a chrominance signal having different phase in color vector space, i.e., it changes to a chrominance signal of a different color. Hereinbelow, the phase in the color vector space will be referred to as "hue".

In addition, because a desired chrominance signal of a low signal level vanishes as a result of the slice processing, faithful image reproduction is degraded. Hereinbelow, a signal level will be referred to as a saturation.

Moreover, a chrominance signal of high saturation normally includes a color noise component of low saturation δS which accompanies a desired chrominance signal of high saturation $S_0$ and varies with time. In such a case, because color noise slice processing reduces only the desired chrominance signal $S_0$, and because the varying noise component δS accompanying the desired chrominance signal $S_0$ does not change, the color signal-to-noise ratio is degraded by color noise slice processing.

As an example, let a desired color-difference signal B-Y of high saturation be accompanied by a time-dependent color noise δSb(t), while let a desired color-difference signal R-Y of high saturation be accompanied by time-dependent color noise δSr(t). Then, if δSb and δSr change in a manner that satisfies the following equation, $$\delta Sb/\delta Sr = Sb/Sr, \tag{11}$$

then the hue of chrominance signal S+δS will not vary with time even when the time-dependent noise δS superposes on the desired chrominance signal. In this case, although the time-variation δS(t) of chrominance signal S causes saturation noise, it does not result in color noise (hue noise).

However, the time-variation in saturation of the color-difference signal generated through chrominance signal processing does not generally satisfy equation (11). As a result, fluctuation in a color-difference signal results in simultaneous saturation noise and color noise.

When a color-difference signal of time-varying and high saturation $(R-Y)_0 + \delta Sr(t)$ is supplied to the color noise slice circuit 57, the slice circuit 57 carries out following processing in accordance with equation (1);

$$(R-Y)' = (R-Y)_0 + \delta Sr(t) - \Delta S = [(R-Y)_0 - \Delta S] + \delta Sr(t) \tag{12}$$

As is clear from equation (12), time-variation δSr(t) is not eliminated by subtraction of constant ΔS from the varying chrominance signal and remains unchanged in the slice-processed color difference signal (R-Y)'. Moreover, because the desired chrominance signal $(R-Y)_0$ as well undergoes slice processing, the signal-to-noise ratio becomes $|[(R-Y)_0 - \Delta S]/\delta Sr|$, which is smaller than the signal-to-noise ratio $|(R-Y)_0/\delta S|$ preceding color noise slice processing. In addition, digital color noise slice processing entails the problem of increased circuit scale.

The present invention has been developed in view of the above-described problems of the prior art and is directed toward providing a color noise slice processing circuit and color noise slice processing method that do not bring about changes in hue in color noise slice processing; that do not vanish the chrominance signal of a prescribed hue through color noise slice processing even if the signal level is low; that do not cause a decrease in the signal-to-noise ratio in noise slice processing of a chrominance signal having a prescribed hue; and finally, that allow a reduction in circuit scale.

SUMMARY OF THE INVENTION

The first noise slice method of the present invention includes the steps of:

receiving a red color-difference signal and a blue color-difference signal, which are components of a chrominance signal, and generating values of an angle $\theta = \tan^{-1} (R-Y)/(B-Y)$ corresponding to the ratio (R-Y)/(B-Y) of the magnitude of the red color-difference signal (R-Y) to the magnitude of the blue color-difference signal (B-Y);

generating values of sin θ and cos θ from said angle θ;

establishing a preset slice width ΔS;

multiplying said preset slice width ΔS by said sin θ and cos θ and generating Vr=ΔS * sin θ and Vb=ΔS * cos θ; and executing color noise slice processing of said red color-difference signal using Vr as a color noise slice threshold, and executing color noise slice processing of said blue color-difference signal using Vb as a color noise slice threshold.

Consider two-dimensional color vector space defined by the red color-difference signal R-Y as ordinate and the blue color-difference signal B-Y as the abscissa, and let a chrominance signal be represented as a vector with an angle of θ degrees with respect to the abscissa. Then, color noise slice width Vr and Vb are the R-Y-axis and B-Y-axis components of vector V having a length of ΔS and lying parallel to the chrominance signal vector. Accordingly, if the color noise slice width Vr is sliced off from color-difference signal R-Y and the color noise slice width Vb is sliced off from color-difference signal B-Y through color noise slice processing, then the chrominance signal becomes a vector shortened by the magnitude of vector V. As a result, a chrominance signal following color noise slice processing maintains the same hue as the chrominance signal preceding the processing. Thus, changes in hue due to color noise slice processing can be prevented.

The second color noise slice method of the present invention includes steps of:

receiving a red color-difference signal and a blue color-difference signal, which are components of a chrominance signal, and generating values of an angle $\theta = \tan^{-1}(R-Y)/(B-Y)$ corresponding to the ratio $(R-Y)/(B-Y)$ of the magnitude of the red color-difference signal (R-Y) to the magnitude of the blue color-difference signal (B-Y);

generating values of $\sin \theta$ and $\cos \theta$ from said angle $\theta$;

establishing a slice width $\Delta S$;

generating a value of a preestablished function $F(\theta)$ using said $\theta$ as a variable;

receiving said $\Delta S$, said $\sin \theta$, said $\cos \theta$, and said $F(\theta)$, and generating values of $Vr = \Delta S * F(\theta) * \sin \theta$ and $Vb = \Delta S * F(\theta) * \cos \theta$; and executing color noise slice processing of a red color-difference signal using Vr as a color noise slice threshold, and executing color noise slice processing of a blue color-difference signal using Vb as a color noise slice threshold.

The color noise slice width Vr and Vb of the first color noise slice method of the present invention correspond to the case in which coefficient $F(\theta)$ of the color noise slice width Vr and Vb of the second method of the present invention is 1, and the fundamental operations of the first method hold true for the second method as well.

As described hereinabove, according to the first color noise slice method of the present invention, the magnitude (saturation) of a chrominance signal vector following the color noise slice processing equals the magnitude of chrominance signal vector preceding color noise slice process minus the magnitude of vector V, i.e., $\Delta S$.

As a result, if the level of a chrominance signal (i.e., the magnitude of a chrominance signal vector) before color noise slice processing is smaller than $\Delta S$, the chrominance signal will be vanished as a result of the color noise slice processing.

The second color noise slice method has been developed with the object of solving this problem. According to this method, rather than using $\Delta S$ as unchanged, coefficient $F(\theta)$ is multiplied and $\Delta S * F(\theta)$ is used as the preset slice width. $F(\theta)$ can be arbitrarily established depending on hue $\theta$. As a result, for hues of a desired chrominance signal having low saturation, the above-described vanishment of the desired signal due to the color noise slice processing can be avoided by decreasing the value of $F(\theta)$.

The color noise slice circuits of the present invention is a circuit for implementing the first and second color noise slice method of the present invention.

Instead of using ordinary operation circuits as the $\theta$ generation circuit, sine value generation circuit, cosine value generation circuit, and coefficient generation circuit, the circuit of the present invention treats input signals as addresses and uses memories to store as data the signals that are to be provided as an output, thereby enabling a reduction of circuit scale as well as a reduction in power consumption.

The above and other objects, features, and advantages of the present invention will become apparent from the following description referring to the accompanying drawings which illustrate examples of preferred embodiments of the present invention.

BRIEF DESCRIPTION OF THE DRAWINGS

FIG. 7(*a*) shows the output characteristics of a slice circuit plotted against the color-difference signal B-Y of a chrominance signal, and FIG. 7(*b*) shows the output characteristic of a color noise slice circuit plotted against the color-difference signal R-Y of a chrominance signal.

DETAILED DESCRIPTION OF THE PREFERRED EMBODIMENTS

Figure 5:
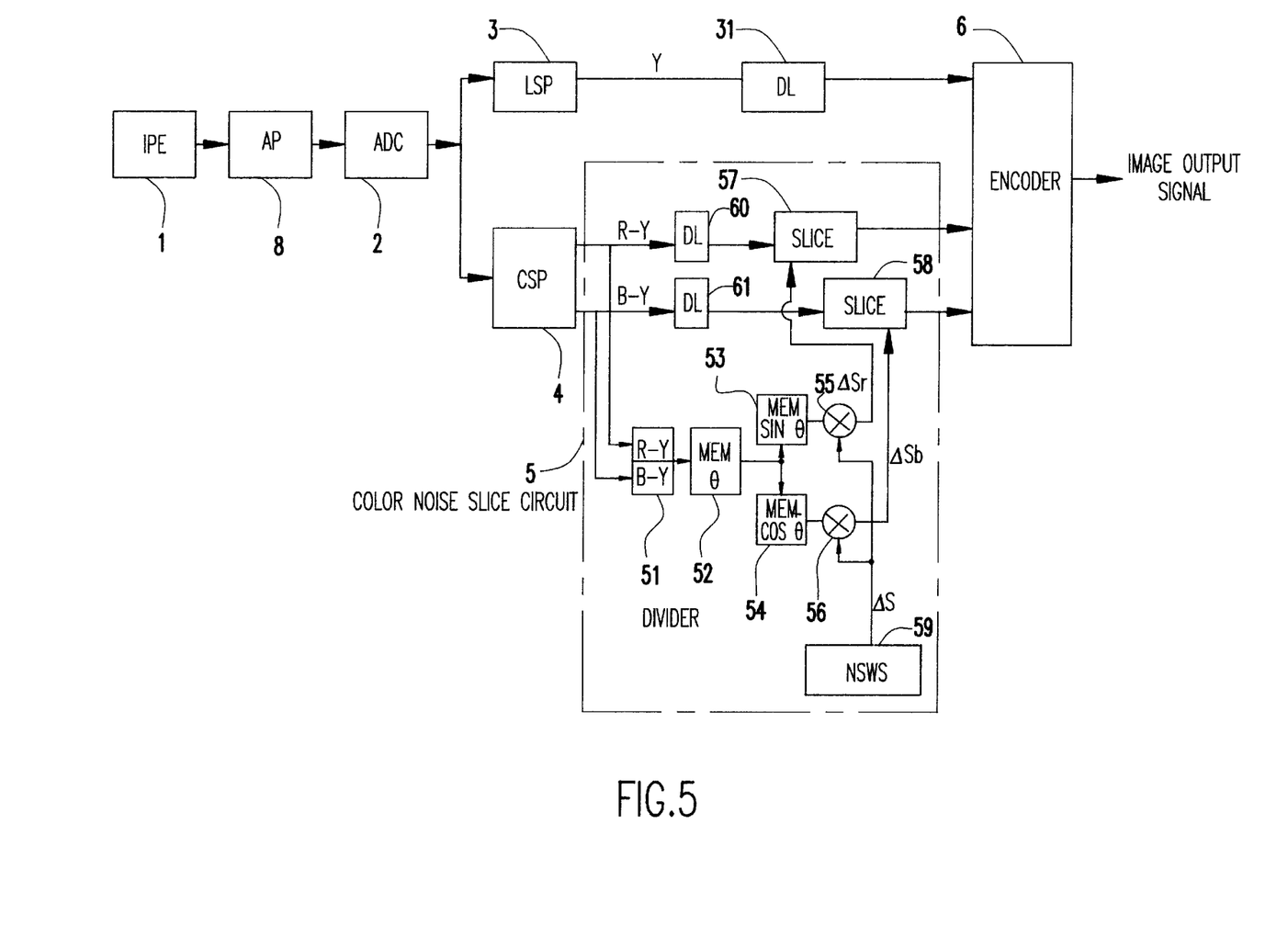
FIG. 5 shows the construction of a color noise slice circuit according to the first embodiment of the present invention.

Embodiments of the present invention will next be described in detail with reference to the accompanying figures. FIG. 5 is a block diagram showing the first embodiment of the present invention in which the elements corresponding to those of the circuit shown in FIG. 1 are identified by the same reference numerals.

The details of the construction of color noise slice circuit 5 of this embodiment will first be given below.

In addition to noise slice width setting circuit 59 and slice circuits 57 and 58 which have functions similar to the slice circuits of FIG. 1, the present color noise slice circuit 5 is provided with divider circuit 51, memories 52, 53, and 54, multipliers 55 and 56, and delay circuits 60 and 61.

Divider circuit 51 receives two color-difference signals (R-Y) and (B-Y) generated by chrominance signal processing circuit 4 and calculates the quotient $(R-Y)/(B-Y) = \alpha$. Memory 52 has an address designated by $\alpha$ and stores in advance angle data $\theta = \tan^{-1}\alpha$ corresponding to each address.

Each of memories 53 and 54 has an address designated by angle $\theta$, and stores in advance $\sin \theta$ and $\cos \theta$, respectively, as data corresponding to each address.

Multipliers 55 and 56 multiply slice width $\Delta S$ preset in noise slice width setting circuit 59 by $\sin \theta$ and $\cos \theta$ read out from memories 53 and 54, respectively, to generate the color noise slice widths:

$$\Delta Sr = \Delta S * \sin \theta \qquad (13)$$

$$\Delta Sb = \Delta S * \cos \theta \qquad (14)$$

Delay circuits 60 and 61 delay color-difference signals (R-Y) and (B-Y) received from chrominance signal processing circuit 4 by a prescribed time interval, respectively. Slice circuits 57 and 58 carry out the following slice processes on the delayed color-difference signals (R-Y) and (B-Y) using $-\Delta Sr$ and $+\Delta Sr$ as well as $-\Delta Sb$ and $+\Delta Sb$ as thresholds, and generate signals (R-Y)' and (B-Y)':

When $$(R-Y) > +\Delta Sr, (R-Y)' = (R-Y) - \Delta Sr \qquad (15)$$

When $$-\Delta Sr \leq (R-Y) \leq +\Delta Sr, (R-Y)' = 0 \qquad (16)$$

When $$(R-Y) < -\Delta Sr, (R-Y)' = (R-Y) + \Delta Sr \qquad (17)$$

and:
When $$(B-Y) > +\Delta Sb, (B-Y)' = (B-Y) - \Delta Sb \qquad (18)$$

When $$-\Delta Sb \leq (B-Y) \leq +\Delta Sb, (B-Y)' = 0 \qquad (19)$$

When $$(B-Y) < -\Delta Sb, (R-Y)' = (B-Y) + \Delta Sb \qquad (20)$$

The other circuit elements are equivalent to those of FIG. 1 and explanation is therefore here omitted.

The delay time of delay circuits 60, 61 is set to equal the total time required for processing in circuit blocks 51, 52, 53 or 54, and 55 or 56. In this way, color-difference signals (R-Y) and (B-Y), and slice widths $\Delta Sr$ and $\Delta Sb$ may be supplied to slice circuits 57 and 58 without bringing about any mismatch in timing.

During operation, color noise slice circuit 5 receives color-difference signals (R-Y) and (B-Y) from chrominance signal processing circuit 4 and calculates (R-Y)/(B-Y) using divider circuit 51. Using the calculated result as an address, color noise slice circuit 5 reads from memory 52 $\theta = \tan^{-1}$ (R-Y)/(B-Y), which corresponds to the hue of chrominance signal; and reads each of $\sin \theta$ and $\cos \theta$ from memories 53 and 54 using $\theta$ as an address.

The color noise slice width $\Delta S$ preset by noise slice width setting circuit 59 is next multiplied by the above-described $\sin \theta$ and $\cos \Delta$ using multipliers 55 and 56 to obtain $\Delta Sr = \Delta S * \sin \theta$ and $\Delta Sb = \Delta S * \cos \theta$.

Finally, slice circuits 57 and 58 receive the above-described $\Delta Sr$ and $\Delta Sb$ as slice thresholds, execute slice processing of color-difference signals (R-Y) and (B-Y) delayed by delay circuits 60 and 61 using $-\Delta Sr$ and $\Delta Sr$ as well as $-\Delta Sb$ and $\Delta Sb$ as slice thresholds, and provide a slice processing output of color-difference signals (R-Y)' and (B-Y)'.

Instead of using divider circuit 51, it is possible in the present embodiment as well to obtain the results of division by a Look-Up Table (LUT) method in which memories are employed that store in advance the above-described division results as data for the addresses designated by (R-Y) and (B-Y).

It is also possible, as examples of possible modifications of the circuit structure of divider circuit 51 and memory 52, 53, and 54, to use a configuration in which memory 52 and memory 53 are integrated into a single memory and memory 52 and memory 54 are also integrated into a single memory, or a circuit structure in which divider circuit 51 and memory 52 are integrated into a single memory from which $\sin \theta$ and $\cos \theta$ are read for the two address inputs designated by color-difference signals (R-Y) and (B-Y).

It is to be noted that any modification of the circuit structure is possible as long as color noise slice circuit 5 is a circuit by which two slice widths $\Delta Sr$ and $\Delta Sb$ are obtained for received color-difference signals (R-Y) and (B-Y) and for preset noise slice width $\Delta S$, wherein $$\Delta Sr = \Delta S * \sin \theta \qquad (21)$$

$$\Delta Sb = \Delta S * \cos \theta. \qquad (22)$$

Figure 6:
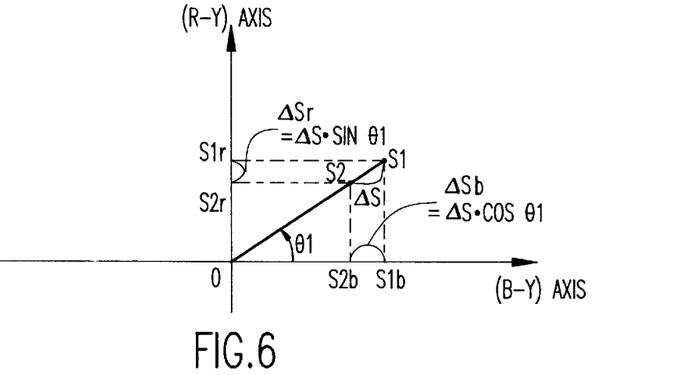
FIG. 6 is a color vector diagram showing a chrominance signal preceding and following color noise slice processing by the color noise slice circuit of FIG. 5.

FIG. 6 is a color vector diagram with color-difference signal R-Y as the ordinate and color-difference signal B-Y as the abscissa, showing chrominance signal S1 before color noise slice processing and chrominance signal S2 after the processing.

In this figure, chrominance signals S1 and S2 are represented using the coordinate components as S1=(S1b, S1r) and S2=(S2b, S2r). In addition, $\theta_1$ is the angle of chrominance signal S1 with respect to the (B-Y) axis.

When the color noise slice width is set to $\Delta S$ by color noise slice width setting circuit 59, slice circuits 57 and 58 establish the relation between the coordinate components of chrominance signals S1 and S2 as follows:

$$S2b = S1b - \Delta Sb = S1b - \Delta S * \cos \theta_1 \qquad (23)$$

$$S2r = S1r - \Delta Sr = S1r - \Delta S * \sin \theta_1 \qquad (24)$$

Figure 7A:
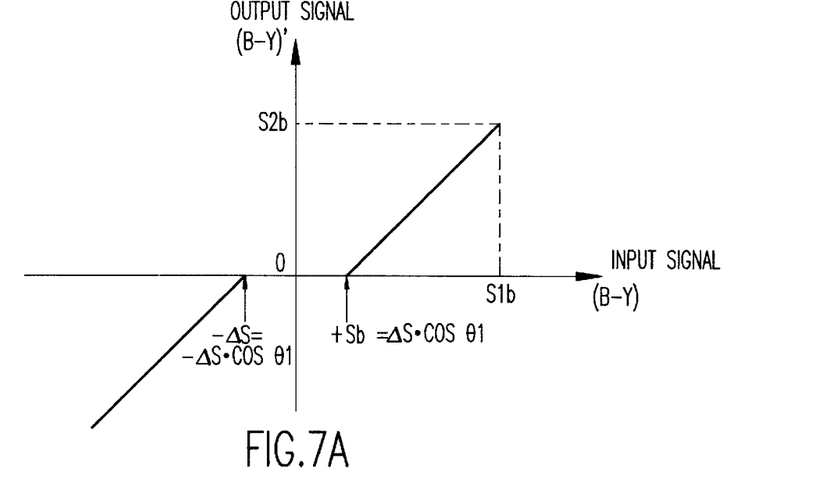
Figure 7B:
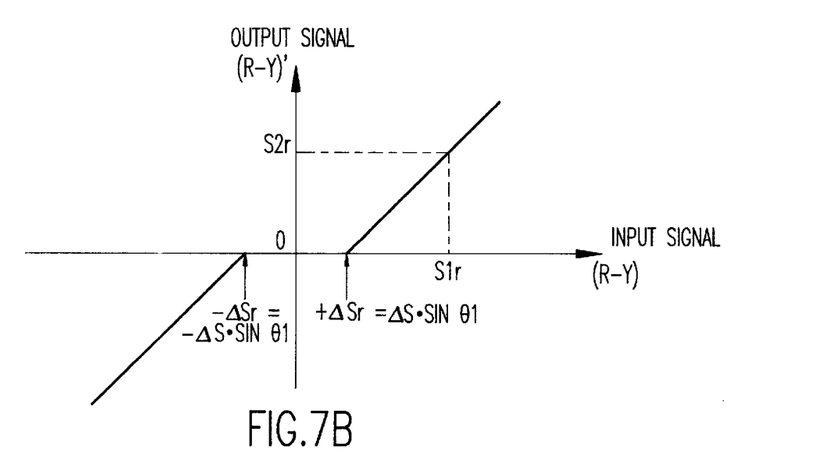

According to this relation, the angle of chrominance signal S2 following color noise slice processing with respect to the (B-Y) axis and the angle of chrominance signal S1 preceding color noise slice processing with respect to the (B-Y) axis are both $\theta_1$, meaning that no change occurs in the angle through color noise slice processing, and accordingly, no change in hue is brought about by the color noise slice processing FIG. 7(*a*) and (*b*) show the output characteristics of color noise slice circuit 5 versus received color-difference signal components (R-Y) and (B-Y) of chrominance signal S1, respectively. These characteristics are identical to the output characteristics for the case in which color noise slice processing is performed using $\Delta S * \sin \theta_1$ and $\Delta S * \cos \theta_1$ in place of preset noise slice width $\Delta S$ of the circuit shown in FIG. 1.

Figure 8:
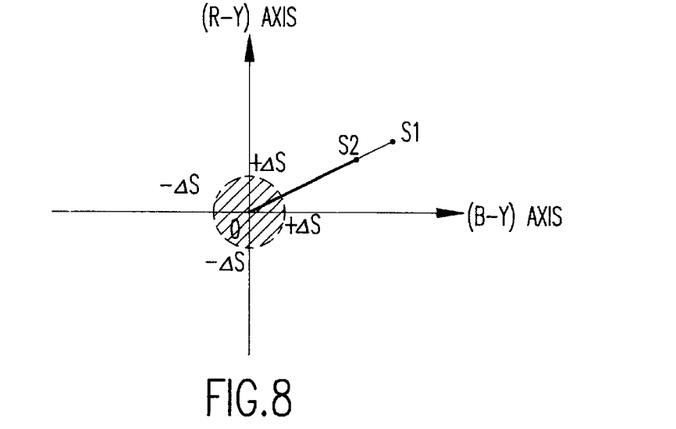
FIG. 8 is a color vector diagram showing the range of chrominance signals that are sliced off by the slice processing of the color noise slice circuit of FIG. 5.

FIG. 8 is a color vector diagram showing the range of chrominance signals S that are sliced off by the color noise slice processing executed by color noise slice circuit 5. In this figure, the range of the chrominance signals S is shaded by slanted lines.

As can be seen from the figure, if the color noise slice width is set to $\Delta S$ by color noise slice width setting circuit 59, the portion of the chrominance signal interior of the circle with a center located at the origin and a radius $\Delta S$ (hereinbelow referred to as the "slice circle") is cut off by the slice processing. Accordingly, when the magnitude (absolute value) of chrominance signal S1 is greater than $\Delta S$, the portion of the chrominance signal that extends beyond the perimeter of the slice circle becomes chrominance signal S2 following slice processing. If the starting point of the chrominance signal vector following the slice processing is shifted to the origin of the coordinate system, vector S2 may be represented as the heavy line shown in the figure. Accordingly, the hue will remain unchanged by the color noise slice processing of the present embodiment whatever the hue of the chrominance signal preceding color noise slice processing. If the magnitude of the chrominance signal is less than ΔS, however, the chrominance signal will be vanished by the slice processing.

Thus, color noise slice circuit 5 of the present embodiment allows elimination of the color noise signal and output of a signal of good color signal-to-noise ratio without altering the hue of the output chrominance signal regardless of the hue of the received chrominance signal.

Since the present embodiment is structured to have the minimum composition for each function to achieve the above-described characteristic, the present embodiment allows the circuit scale for the color noise slice processing to be reduced, thereby allowing power consumption to be decreased.

The second embodiment of a color noise slice circuit according to the present invention will next be described with reference to FIG. 9.

Figure 9:
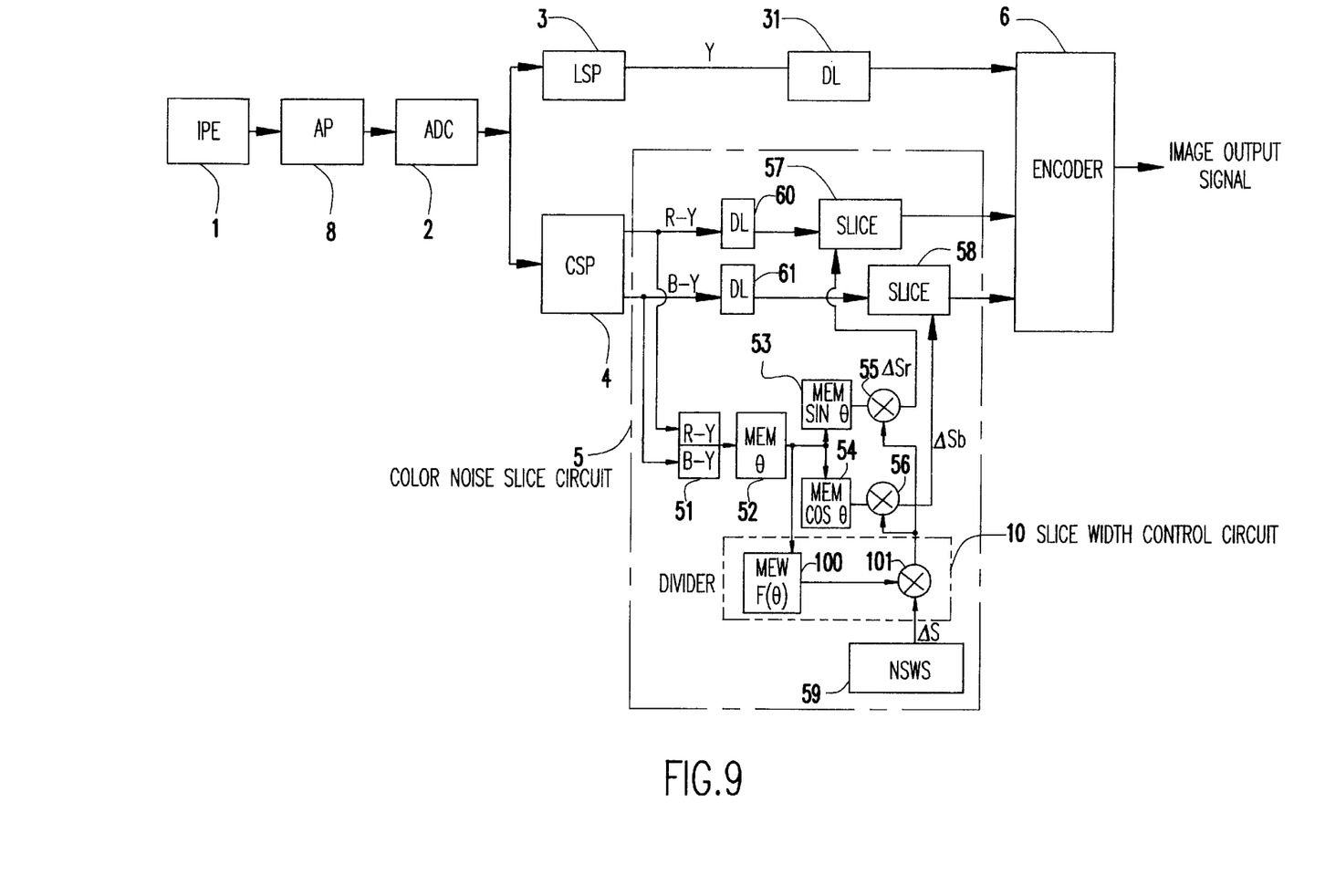
FIG. 9 shows the construction of the color noise slice circuit of the second embodiment of the present invention.

In FIG. 9, components equivalent to those of FIG. 5 are identified by the same reference numerals. Referring to FIG. 9, in addition to the components of the circuit of FIG. 5, color noise slice circuit 5 of this embodiment further incorporates slice width control circuit 10 by which the slice width is controlled.

Slice width control circuit 10 is provided with memory 100 that has an address designated by angle θ and stores in advance prescribed function F(θ) as data. The slice width control circuit 10 is further provided with multiplier 101 that multiplies preset slice width ΔS by the F(θ).

The result of multiplication executed by the multiplier 101 is then supplied to the above-described multipliers 55 and 56, and individually multiplied by sin θ and cos θ to generate new slice widths ΔSr and ΔSb. The construction of the color noise slice circuit is otherwise equivalent to that of FIG. 5.

In operation, color-difference signals (R-Y) and (B-Y) supplied from chrominance signal processing circuit 4 are received by divider circuit 51 where (R-Y)/(B-Y) is calculated. The value θ=tan$^{-1}$ (R-Y)/(B-Y) is stored as data at the address in memory 52 designated by the result of this division operation. Memories 53 and 54 each receive θ from memory 52 as addresses, and provide sin θ and cos θ, respectively, as outputs.

In addition, angle θ is supplied as an address input to memory 100 of slice width control circuit 10, and a value of F(θ) corresponding to the θ is read from memory 100. Multiplier 101 multiplies by function F(θ) the preset slice width ΔS delivered from noise slice width setting circuit 59 to calculate ΔS * F(θ). The value of multiplied slice width ΔS * F(θ) generated by multiplier 101 is further multiplied by the above-described sin θ and cos θ by multipliers 55 and 56 to calculate the values ΔSr=ΔS * F(θ) * sin θ and ΔSb=ΔS * F(θ) * cos θ.

Slice circuits 57 and 58 receive ΔSr and ΔSb as slice widths; carry out slice processing of color-difference signals (R-Y) and (B-Y) supplied from delay circuits 60 and 61 using −ΔSr and ΔSr as well as ΔSb and ΔSb as thresholds; and provide the slice processed color-difference signals (R-Y)' and (B-Y)'. In this embodiment as well, instead of carrying out a division operation in divider circuit 51, quotients may be found by means of, for example, a Look-Up Table (L.U.T.) method which employs a memory and stores in advance the quotient resulting from the division of R-Y by B-Y in the address designated by R-Y and B-Y.

In addition, in place of divider circuit 51 and memory circuits 52, 53, and 54, a circuit structure may also be adopted in which divider circuit 51 and memory circuit 52 are provided as a single memory circuit, or in which memory circuit 52, memory circuit 53 and memory circuit 54 are provided as a single memory circuit. Any circuit structure may be employed as long as the two outputs, sin θ and cos θ, can be obtained for the two inputs, color-difference signals (R-Y) and (B-Y).

Moreover, the circuit that calculates ΔSr and ΔSb may be of any circuit structure as long as the circuit allows, in response to input of color-difference signal (R-Y), color-difference signal (B-Y), and preset slice width ΔS, to calculate the following equations:

$$\Delta Sr = \Delta S * F(\theta) * \sin \theta \quad (25)$$

$$\Delta Sb = \Delta S * F(\theta) * \cos \theta \quad (26)$$

Figure 10:
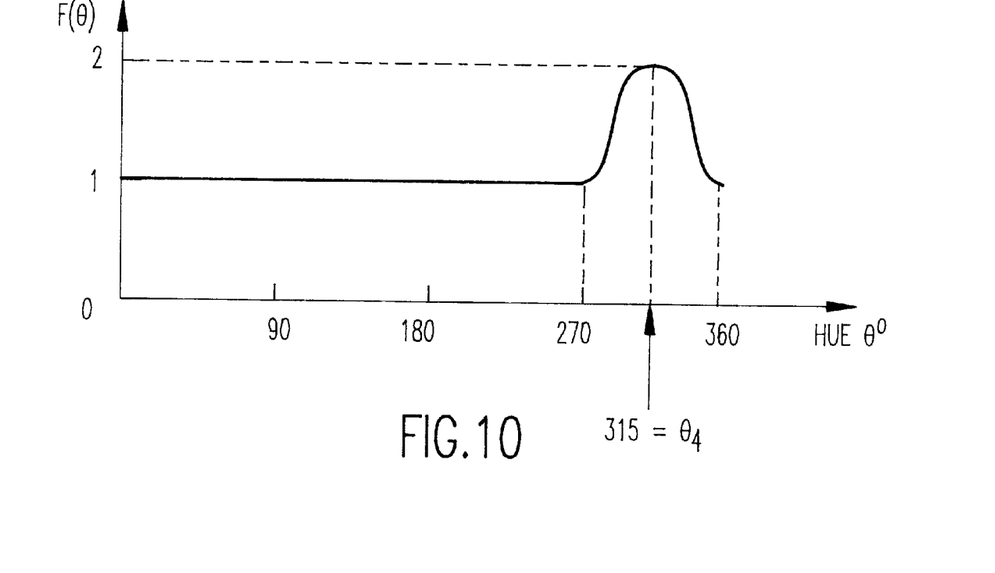
FIG. 10 shows one example of Function $F(\theta)$ stored in memory 100 of FIG. 9.

FIG. 10 shows an example of function F(θ) stored in memory 100. Angle θ° representing the hue of the chrominance signal is within the range 0≦θ≦360. F(θ) shown in FIG. 10 is intended to reduce the color noise level in the proximity of θ=315° and thereby to improve the color signal-to-noise ratio, by setting F(θ) to equal 2 at that angle to increase the color noise slice width for a chrominance signal of the intended angle.

Since function F(θ) can be optionally defined and can be stored in memory 100, the slice width can be configured for every hue (angle θ) in accordance with equations (25) and (26).

For this reason, the value of function F(θ) is made large so as to make the noise slice width wide at the hue θ of a high color-noise level in order to improve the color signal-to-noise ratio of a chrominance signal. For a hue of a desired chrominance signal of low level (saturation), the value of function F(θ) is made small to decrease the noise slice width so that the desired chrominance signal will not be vanished by the color noise slice processing. Finally, for the hue of a chrominance signal having high saturation, the value of function F(θ) is made θ to make the noise slice width also θ and thereby prevent degradation of the color signal-to-noise ratio of the chrominance signal.

Figure 11:
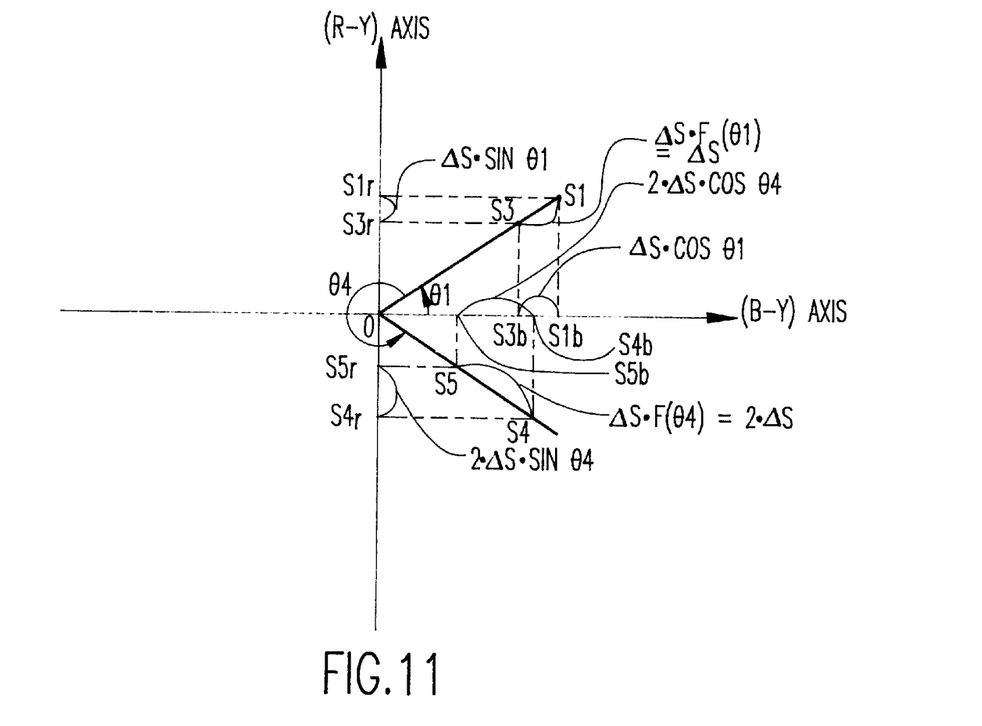
FIG. 11 is a color vector diagram showing chrominance signals S1 and S4 before the color noise slice processing by the color noise slice circuit of FIG. 9, and chrominance signals S3 and S5 after the color noise slice processing.

FIG. 11 is a color vector diagram in color vector space made up by the (R-Y) axis and the (B-Y) axis and showing chrominance signals S1 and S4 before color noise slice processing, and chrominance signals S3 and S5 following color noise slice processing The figure illustrates the case in which function F(θ) stored in memory 100 has the characteristics shown in FIG. 10.

Using coordinate components to represent chrominance signals S1 and S4 before color noise slice processing, let S1=(S1b, S1r) and S4=(S4b, S4r). And let the angles $\theta_1$ and $\theta_4$ of chrominance signals S1 and S4 with respect to the (B-Y) axis be both 315°. Again, using coordinate components to represent chrominance signals S3 and S5 following color noise slice processing, let S3=(S3b, S3r) and S5=(S5b, S5r).

If the preset slice width is set to ΔS at color noise slice width setting circuit 59, then the following relations hold between the coordinate components of chrominance signals S1 and S3 through the processing of color noise slice circuit 5:

$$S3b = S1b - \Delta Sb = S1b - \Delta S * F(\theta_1) * \cos\theta_1 \quad (27)$$
$$= S1b - \Delta S * \cos\theta_1$$
$$S3r = S1r - \Delta Sr = S1r - \Delta S * F(\theta_1) * \sin\theta_1 \quad (28)$$
$$= S1r - \Delta S * \sin\theta_1$$

In the same way, the relation between the coordinate components of chrominance signals S4 and S5 is:

$$S5b = S4b - \Delta Sb = S4b - \Delta S * F(\theta_{(4)}) * \cos\theta_4) \quad (29)$$
$$= S4b - 2 * \Delta S * \cos\theta_4$$
$$S5r = S4r - \Delta Sr = S4r - \Delta S * F(\theta_4) * \sin\theta_4 \quad (30)$$
$$= S4r - 2 * \Delta S * \sin\theta_4$$

In the above equations, $F(\theta_1)$ is set to 1 and $F(\theta_4)$ is set to 2 so that the color noise slice width of input chrominance signals S1 and S4 become $\Delta S * F(\theta_1) = \Delta S$ and $\Delta S * F(\theta_4) = 2 * \Delta S$, respectively. Accordingly, the multiplied slice width is $\Delta S$ when $\theta = \theta_1$ and $2\Delta S$ when $\theta = \theta_2$. Thus, the slice width can be modified depending on the level of color noise and depending on the saturation of the desired chrominance signal.

Again, the angles of chrominance signals S3 and S5 with respect to the (B-Y) axis following color noise slice processing are $\theta_1$ and $\theta_4$, respectively, and these angles are each equal to the angles $\theta_1$ and $\theta_4$ of chrominance signals S1 and S4 with respect to the (B-Y) axis preceding color noise slice processing. From this, it can be seen that the hue $\theta$ is not changed by the color noise slice processing of the present invention.

Figure 12:
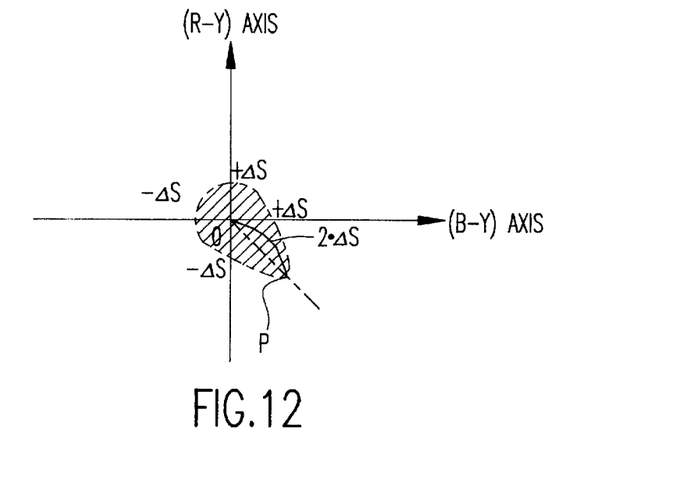
FIG. 12 is a color vector diagram showing one example of the range of chrominance signals that are sliced off by the color noise slice processing of the color noise slice circuit shown in FIG. 9.

FIG. 12 is a vector diagram showing the range of a chrominance signal S to be sliced off by color noise slice processing (hereinbelow referred to as "slice range"). The slice range is shaded by the slanted lines in the figure. In this figure, function $F(\theta)$ stored in memory 100 has the same characteristics as shown in FIG. 10.

In this example, the preset slice width is set to $\Delta S$ by color noise slice width setting circuit 59, and chrominance signals are sliced off by the color noise slice processing within a range enclosed by a circle with a center located at the coordinate origin and a radius $\Delta S$ and also by the tangent lines drawn to the circle from the point P located at a distance $2 * \Delta S$ at an angle $\theta = 315°$ with respect to the (B-Y) axis.

In the present embodiment, the color noise slice width can be controlled for every chrominance signal hue $\theta$ by configuring the shape of function $F(\theta)$. And no change in hue occurs due to color noise slice processing for chrominance signals of any hues.

As described in the foregoing explanation, the color noise slice circuit of the present invention offers the following advantages:

The color reproducibility of an image signal can be improved by calculating the hue $\theta$ of a chrominance signal from the detected color difference signals and controlling the color noise slice width as a function of the hue.

The color signal-to-noise ratio of image signals can be improved by taking advantage that the color noise slice width can be optionally and easily controlled for every hue so that the color noise slice width may be set to a low level when the signal level of a desired chrominance signal is low, thereby preventing vanishment of the desired chrominance signal by the color noise slice processing, or set to a high level for signals having a high level of color noise.

Because the circuit is structured from the smallest circuits necessary for realizing each function, the circuit scale required for the color noise slice process can be reduced, and power consumption can also be decreased, thereby enabling miniaturization and reduced power consumption.

It is to be understood, however, that although the characteristics and advantages of the present invention have been set forth in the foregoing description, the disclosure is illustrative only, and changes may be made in the shape, size, and arrangement of the parts within the scope of the appended claims.

What is claimed is:

1. A color noise slice circuit of an image pickup device for performing a color noise slice processing to reduce noise of a chrominance signal in a digital signal transmitted from an image pickup element, by processing a red color-difference signal (R-Y) and a blue color-difference signal (B-Y) of the chrominance signal, comprising:

sine value and cosine value generation means for generating values of sin $\theta$ and cos $\theta$, respectively, wherein the angle $\theta$ equals $\tan^{-1}(R-Y)/(B-Y)$ and $(R-Y)/(B-Y)$ is a ratio of a magnitude of the red color-difference signal (R-Y) to a magnitude of the blue color-difference signal (B-Y);

slice width setting means for presetting a slice width $\Delta S$;

multiplication means for multiplying the preset slice width $\Delta S$ by said sin $\theta$ and cos $\theta$ and providing a slice width for the red color-difference signal $Vr = \Delta S * \sin\theta$ and a slice width for the blue color-difference signal $Vb = \Delta S * \cos\theta$; and slice means for executing color noise slice processing of said red and blue color-difference signals through which the slice widths for said red and blue difference signals (Vr,Vb) are sliced off from the red and blue color-difference signals, respectively.

2. A color noise slice circuit according to claim 1 wherein said sine value and cosine value generation means is a memory that stores in advance values of sin $\theta$ and cos $\theta$ corresponding to the addresses designated by the magnitudes of said red and blue color-difference signals.

3. A color noise slice circuit of an image pickup device for performing a color noise slice processing to reduce noise of a chrominance signal in a digital signal transmitted from an image pickup element, by processing a red color-difference signal (R-Y) and a blue color-difference signal (B-Y) of the chrominance signal, comprising:

$\theta$ generation means for generating a value of an angle $\theta = \tan^{-1}(R-Y)/(B-Y)$, wherein $(R-Y)/(B-Y)$ is a ratio of a magnitude of the red color-difference signal (R-Y) to a magnitude of the blue color-difference signal (B-Y), sine value and cosine value generation means for generating values of sin $\theta$ and cos $\theta$, respectively, slice width setting means for presetting a slice width $\Delta S$;

coefficient generation means for generating a value of a preestablished function $F(\theta)$ using said $\theta$ as a variable;

multiplication means for calculating values of a multiplied slice width for the red color-difference signal $Vrm = \Delta S * F(\theta) * \sin\theta$ and a multiplied slice width for the blue color-difference signal $Vbm = \Delta S * F(\theta) * \cos\theta$; and slice means for executing color noise slice processing of said red and blue color-difference signals through which the multiplied slice widths for said red and blue difference signals (Vrm, Vbm) are sliced off from the red and blue color-difference signals, respectively.

4. A color noise slice circuit according to claim 3 wherein said coefficient generation means is a memory that stores in advance values of the function $F(\theta)$ corresponding to addresses designated by said $\theta$.

5. A color noise slice method for an image pickup device of performing a color noise slice processing to reduce noise of a chrominance signal in a digital signal of image pickup output from an image pickup element, by processing a red color-difference signal (R-Y) and a blue color-difference signal (B-Y) of the chrominance signal, comprising steps of:

calculating the ratio a of a magnitude of the red color-difference signal (R-Y) to a magnitude of the blue color-difference signal (B-Y) and generating values of an angle $\theta=\tan^{-1}\alpha$;

generating values of $\sin \theta$ and $\cos \theta$;

presetting a slice width $\Delta S$;

multiplying the preset slice width $\Delta S$ by said $\sin \theta$ and $\cos \theta$ and generating $Vr=\Delta S * \sin \theta$ as a color noise slice width for the red color-difference signal and $Vb=\Delta S * \cos \theta$ as a color noise slice width for said blue color-difference signal, respectively; and executing color noise slice processing of said red color-difference signal using said slice width Vr, and executing color noise slice processing of said blue color-difference signal using said slice width Vb.

6. A color noise slice method for an image pickup device of performing a color noise slice processing to reduce noise of a chrominance signal in a digital signal of image pickup output from an image pickup element, by processing a red color-difference signal (R-Y) and a blue color-difference signal (B-Y) of the chrominance signal, comprising steps of:

calculating the ratio $\alpha$ of a magnitude of the red color-difference signal (R-Y) to a magnitude of the blue color-difference signal (B-Y) and generating values of an angle $\theta=\tan^{-1}\alpha$;

generating values of $\sin \theta$ and $\cos \theta$;

presetting a slice width $\Delta S$;

generating a value of a preestablished function $F(\theta)$ using said $\theta$ as a variable;

multiplying the preset slice width $\Delta S$, said $\sin \theta$ and $\cos \theta$ and said $F(\theta)$ to generate $Vrm=\Delta S*F(\theta) * \sin \theta$ as a color noise slice width for the red color-difference signal and multiplying the preset slice width $\Delta S$, said $\cos \theta$ and said $F(\theta)$ to generate $Vrm=\Delta S*F(\theta) * \cos \theta$ as a color noise slice width for the blue color-difference signal; and executing color noise slice processing of a red color-difference signal using Vrm as a color noise slice width, and executing color noise slice processing of a blue color-difference signal using Vbm as a color noise slice width.

* * * * *